United States Patent [19]
Looykens et al.

[11] Patent Number: 5,856,798
[45] Date of Patent: Jan. 5, 1999

[54] MAGNETIC-TAPE RECORDING/ REPRODUCING ARRANGEMENT COMPRISING A CODING DEVICE

[75] Inventors: Marinus A. H. Looykens; Albert M. A. Rijckaert, both of Eindhoven, Netherlands

[73] Assignee: U.S. Philips Corporation, New York, N.Y.

[21] Appl. No.: 841,912

[22] Filed: Apr. 17, 1997

[30] Foreign Application Priority Data

Apr. 26, 1996 [EP] European Pat. Off. .............. 96201141

[51] Int. Cl.$^6$ .................................................. H03M 13/00
[52] U.S. Cl. .......................................... 341/94; 360/77.13
[58] Field of Search ........................................ 341/68, 94

[56] References Cited

U.S. PATENT DOCUMENTS

| | | | |
|---|---|---|---|
| 4,752,832 | 6/1988 | Higurashi | 358/310 |
| 5,161,171 | 11/1992 | Suzuki et al. | 375/108 |
| 5,438,458 | 8/1995 | Honjo | 360/10.2 |
| 5,546,247 | 8/1996 | Fujioka et al. | 360/77.13 |
| 5,724,034 | 3/1998 | Nielander et al. | 341/94 |

FOREIGN PATENT DOCUMENTS

0476767B1   3/1992   European Pat. Off. .

*Primary Examiner*—Marc S. Hoff
*Attorney, Agent, or Firm*—Edward W. Goodman

[57] ABSTRACT

A magnetic-tape recording/reproducing arrangement of the "helical scan" type adapted to record and/or reproduce a digitally coded video signal, includes a coding device (3). In the recording mode, the coding device (3) performs channel-encoding upon a digital recording signal (C) so as to form a channel signal (D) for recording on the magnetic tape (7.1). In the reproduction mode, the coding device (3) performs channel-decoding upon the channel signal (H) read from the magnetic tape (7.1), so that a digital reproduction signal is formed which is a replica of the original recording signal (C). For this purpose, the coding device (3) includes a data sequence generator (3.3) adapted to generate a data sequence (E) defined by the polynomial $P(X)=X^{15}+X^A+1$, where A=7 or 8. Furthermore, the coding device (3) may include an XOR circuit (3.2) in which the signal (C, H) to be processed is combined with the generated data sequence (E), and a selection circuit (3.1) for selecting the signal to be processed (C, H) from the recording signal (C) and the channel signal (H), in dependence upon the mode of operation of the recording/reproducing arrangement.

14 Claims, 4 Drawing Sheets

MAGNETIC-TAPE RECORDING/ REPRODUCING ARRANGEMENT COMPRISING A CODING DEVICE

BACKGROUND OF THE INVENTION

1. Field of the Invention

The invention relates to a magnetic-tape recording/ reproducing arrangement of the "helical scan" type adapted to record and/or reproduce a digitally coded video signal, the arrangement comprising a coding device adapted to perform channel-encoding upon a digital recording signal in order to form a channel signal for recording on the magnetic tape and/or to perform channel-decoding upon a channel signal read from the magnetic tape in order to form a digital reproduction signal. The invention further relates to a magnetic tape on which a signal has been recorded in helical tracks, and to a method of recording a digitally coded video signal in helical tracks on a magnetic tape by channel encoding a digital recording signal in order to form a channel signal for recording on the magnetic tape.

2. Description of the Related Art

Such a magnetic-tape recording/reproducing arrangement is known inter alia from European Patent Specification No. 0 476 767, corresponding to U.S. Pat. No. 5,142,421 (PHN 13537). The known arrangement includes a coding device which converts n-bit words of the recording signal into (n+m)-bit words of the channel signal for recording on the magnetic tape. This is referred to as NRZ-I recording. More specifically, a 24-to-25 bit conversion is described, in which one bit is affixed to each 24-bit word in order to adjust the running digital sum value of the channel signal as a function of time.

SUMMARY OF THE INVENTION

It is an object of the invention to provide a recording/ reproducing arrangement including a coding device which, in a simple manner and without a deterioration of the coding efficiency, counteracts the repetitive generation of "false" synchronization patterns.

To this end, in the magnetic-tape recording/reproducing arrangement in accordance with the invention, the coding device comprises a data sequence generator adapted to generate a data sequence defined by the polynomial $P(X)= X^{15}+X^A+1$, where $A=7$ or $8$.

Devices for forming a data sequence which can be described by an arbitrary polynomial are known per se and are referred to as maximum-length sequence generators, or also as pseudo-random bit-sequence generators. Such generators are frequently used for encrypting (scrambling) a signal in order to preclude decoding by unauthorized persons; the original signal can be recovered only by processing the scrambled signal in an identical and synchronized generator. For such a use, a polynomial is selected which yields favorable properties as regards the security of the scrambled information; "hacking" the protected information should be virtually impossible for those unauthorized. For use in a magnetic-tape recording/reproducing arrangement, the choice of a data sequence generator should be based on other criteria. In order to elucidate these criteria and the arrangement in accordance with the invention, some relevant aspects of a magnetic-tape recording/reproducing arrangement in accordance with a new digital recording system to be developed will now be described first by way of example.

During a recording mode, an incoming digital signal is divided into groups of 792 bits, after which error correction data is added. This results in recording-signal blocks of 856 bits each. These recording-signal blocks are applied to the coding device in the recording signal. In the coding device, the recording signal is processed (channel coding) so as to form the channel signal. Since the recording signal has a block structure (recording signal blocks), the channel signal also has a block structure; channelsignal blocks. Subsequently, a synchronization pattern is added to each channel signal block, thereby forming transport signal blocks. After some operations to prepare for recording, these transport signal blocks are recorded on the magnetic tape. One track, as recorded on the tape, comprises 306 transport signal blocks. In a reproduction mode, a detector checks the signal read for the presence of synchronization patterns. When these patterns are detected, the transport signal blocks can be located and the channel signal blocks can be extracted therefrom. Thus, the channel signal is reconstructed. In the coding device, this signal is subjected to an inverse operation (channel decoding) in order to form the digital reproduction signal. This signal is subjected to error correction, after which it is rid of the block structure applied in the recording mode. In this way, a replica of the original incoming signal is produced.

When an arbitrary signal is recorded, it may occur that, by chance, the channel signal somehow corresponds to the synchronization pattern. As a result of this, the detector will detect a "false" synchronization pattern during reproduction. This detector will generally be constructed in such a manner that a sporadically occurring "false" synchronization pattern does not bring the detector out of synchronization. However, if the incoming signal is highly periodic, for example, in that the contents of successive video lines bear much resemblance to one another, "false" synchronization patterns may occur frequently and at a substantially fixed location in the channel signal blocks. In such a case, it will be difficult for the detector to distinguish between the desired synchronization patterns and the "false" synchronization patterns. The detector may then become desynchronized. If the incoming signal is a data stream from a computer or a digitally encoded audio signal, this may also result in a periodicity which gives rise to a regular pattern of "false" synchronization patterns in the channel signal.

In a magnetic-tape recording/reproducing arrangement in accordance with the invention, the recording signal is processed so as to counteract the periodic occurrence of "false" synchronization patterns without the coding efficiency being affected by this processing. For this purpose, the recording signal is combined with a data sequence which is generated by the data sequence generator and by which the recording signal is scrambled. The data sequence comprises a maximum-length sequence, which meets the following design criteria:

(1). The recording signal blocks should be scrambled with different channel sub-sequences in order to preclude recurrent "false" synchronization patterns as a result of the periodicity in the input signal; and (2). The maximum-length sequence should be short to prevent long sequences of only zeros or only ones from being generated, because this makes it more likely that such sequences also occur in the channel signal. Such sequences are less suitable for transmission via a magnetic tape and, besides, no edges occur in such a sequence. (An edge is a transition from a zero to a one or the other way round.) In the recording mode, such edges are necessary to synchronize a phase-locked loop by means of which the bits are reconstructed from the signal read from the tape. The absence of edges in a part of the signal can bring the phase-locked loop out of synchronization. Therefore, in order to preclude this, the maximum-length sequence should be short, i.e., the highest power in the polynomial should be low. The first criterion can be met roughly by selecting a maximum-length sequence of such a length that the sequence is non-repetitive over a long period. This period can, for example, be a period of time corresponding to five video pictures. Such a period of five video pictures is commonly used as a unit in editing video recordings. This period corresponds to 12 tracks on the tape, i.e., to 12×306=3,672 transport signal blocks. In these blocks, 3,672×856=3,143,232 bits should be processed; this would require a maximum-length sequence of $2^{22}-1$ bit, which means that the highest power in the polynomial should be at least 22. However, this solution is in conflict with compliance with the second criterion: a short maximum-length sequence. The arrangement in accordance with the invention utilizes a solution which meets both criteria: a data sequence generator which generates a shorter maximum-length sequence, whose preset value can be different for all the recording signal blocks in a given period. One period of 12 tracks comprises 3,672 transport signal blocks; this means that with a 12-bit preset value, all the recording signal blocks within a period of 12 tracks can be scrambled with a different data subsequence. Due to this solution, a maximum-length sequence of $2^{12}-1$ bit is now adequate, i.e., the highest power in the polynomial should be at least 12.

For practical reasons, which lead to an advantageous implementation of the recording/reproducing arrangement, the following design criteria are important:

(3). The number of feedback loops and XOR circuits in the data sequence generator should be minimal; preferably one; and (4). A multiplicity of bits, preferably at least eight, should be made available, simultaneously, by the data sequence generator, so as to enable an implementation in which a multiplicity of bits of the recording signal is scrambled at the same time. Moreover, it should be possible for the data sequence generator to be adapted simply in such a manner that the generation of such a multiplicity of bits of the data sequence is effected with a frequency lower than the bit rate of the recording signal, for example, a frequency which is eight times as low. All these design criteria are met in an excellent way by a data sequence generator which generates a data sequence of the maximum-length sequence type, which is defined by the polynomial $P(X)=X^{15}+X^7+1$, or by the polynomial $P(X)=X^{15}+X^8+1$. These polynomials, in fact, define identical maximum-length sequences which are mirror-inverted in time relative to one another.

During recording, the recording signal is scrambled in order to form the channel signal which is recorded on the magnetic tape after a further processing comprising the division into data blocks described herein and the addition of a synchronization pattern and error correction data. During reproduction, the signal read from the tape is processed in an inverse manner and the channel signal thus formed is descrambled. Both the scrambling process and the descrambling process comprise the combination of the signal to be processed with the generated data sequence in order to form a processed signal. Therefore, it is advantageous to provide a recording/reproducing arrangement with only one coding device and to provide the latter with selection means for selecting, depending on whether the arrangement is in a recording mode or a reproduction mode, either the recording signal or the channel signal read from the magnetic tape for combination with the generated data sequence. The signal to be processed can be combined with the data sequence by means of, for example, a mixer, such as a double-balanced mixer circuit. However, a preferred embodiment is characterized in that the coding device further comprises modulo-2 adding means for combining the generated data sequence with the signal to be processed, i.e., either the digital recording signal or the channel signal read from the magnetic tape, in order to form a processed signal, i.e., the channel signal to be recorded on the magnetic tape, or the digital reproduction signal. Advantages of the use of modulo-2 adding means, such as an XOR (eXclusive-OR) circuit, for combining the signal to be processed with the data sequence, are that modulo-2 adding means can simply be included in a digital circuit arrangement, and the modulo-2 adding means, in contradistinction to many mixer circuits, does not produce a shift in signal level. The modulo-2 adding means can be implemented in such a manner that always one bit of the signal to be processed is combined with one bit of the generated data sequence, but in implementations which perform other operations on a plurality of bits at a time, it is advantageous to perform the scrambling/descrambling operation also on a plurality of bits at a time. To this end, a preferred embodiment is characterized in that the data sequence generator is adapted to generated an N-bit word, and the modulo-2 adding means comprises N XOR (eXclusive-OR) circuits together arranged to combine the N-bit word from the data sequence generator with an N-bit word of the signal to be processed, in order to form an N-bit word of the processed signal, where N>1. The data sequence generator can be implemented in such a manner that bits of the data sequence are generated with a high frequency corresponding to the bit rate of the signal to be processed. These bits can be supplied one by one and combined with one bit of the signal to be processed, or the bits can be supplied and combined in N-bit words. In the last-mentioned case, supplying and combining is effected with a frequency which corresponds to the bit rate of the signal to be processed, divided by N. An embodiment which is characterized in that the data sequence generator is adapted to generate N-bit words, said words being generated with a frequency corresponding to the bit rate of the signal to be processed divided by N, has the advantage that the data sequence generator also operates at a lower frequency. This reduces the current consumption of the data sequence generator circuit, and also allows the circuit to be realized in an IC process yielding less rapid circuits. The number, N, of bits generated and processed as a word is preferably selected in accordance with the word length used in the other operations. Frequently used word lengths are eight and sixteen bits.

A further embodiment of the recording/reproducing arrangement in accordance with the invention is characterized in that the data sequence generator comprises fifteen serially coupled memory elements ($M_1 \ldots M_{15}$) and an XOR circuit, the memory element $M_k$, where $k=1 \ldots 14$, having its output coupled to the input of the memory element $M_{k+1}$, the last memory element ($M_{15}$) having its output coupled to an input of the XOR circuit, and the seventh or the eighth memory element ($M_A$) having its output coupled to the other input of the XOR circuit, and the XOR circuit having its output coupled to the input of the first memory element ($M_1$). This data sequence generator is adapted to generate bits of the data sequence at a high frequency corresponding to the bit rate of the signal to be processed. These bits can be taken one by one from the output of a memory element, for example, $M_{15}$ and are combined with one bit of the signal to be processed, or the bits can be taken in N-bit words from N consecutively numbered memory elements, for example, $M_8$-- $M_{15}$, N being, for example, eight, and can be combined, at the same time, as an N-bit word with an N-bit word of the signal to be processed. In the last-mentioned case, reading out and combining is effected with a frequency corresponding to the bit rate of the signal to be processed, divided by N. This embodiment is also suitable for use in an implementation in which 16-bit words are processed, if the data sequence generator further comprises a memory element $M_{16}$, the memory element $M_{15}$ having its output coupled to the input of the memory element $M_{16}$. A 16-bit word of the data sequence is now taken from the memory elements $M_1$–$M_{16}$ and combined with a 16-bit word of the signal to be processed. If the embodiment is used in this manner, reading out and combining is effected with a frequency corresponding to the bit rate of the signal to be processed, divided by sixteen.

An embodiment of the recording/reproducing arrangement is characterized in that A=7, and the data sequence generator comprises fifteen coupled memory elements ($M_1$ ... $M_{15}$) and eight XOR circuits ($X_1$ ... $X_8$), the XOR circuit $X_n$ having its output coupled to the input of the memory element $M_n$, where n=1 ... 7, the memory element $M_n$ has its output coupled to the input of the memory element $M_{n+8}$ and to an input of the XOR circuit $X_{n+1}$, the memory element $M_{n+8}$ has its output coupled to the other input of the XOR circuit $X_{n+1}$, the XOR circuit $X_8$ has its output coupled to the input of the memory element $M_8$ and to an input of the XOR circuit $X_1$, and the memory element $M_8$ has its output coupled to the other input of the XOR circuit $X_1$. This data sequence generator is adapted to generate 8-bit words of the data sequence at a lower frequency corresponding to the bit rate of the signal to be processed, divided by eight. Such an 8-bit word is taken from eight consecutively numbered memory elements, for example, $M_8$ –$M_{15}$, and combined with an 8-bit word of the signal to be processed. Reading out and combining is also effected with a frequency corresponding to the bit rate of the signal to be processed, divided by eight. This embodiment is also suitable for use in an implementation in which 16-bit words are processed, if the data sequence generator further comprises a memory element $M_{16}$, the memory element $M_8$ having its output coupled to the input of the memory element $M_{16}$. A 16-bit word of the data sequence is now taken from the memory elements $M_1$–$M_{16}$ and combined with a 16-bit word of the signal to be processed. If the embodiment is used in this manner, reading out and combining is effected with a frequency corresponding to the bit rate of the signal to be processed, divided by sixteen.

The embodiments are also suitable for use in an implementation in which 16-bit words are processed, if the data sequence generator further comprises eight memory elements $M_{16}$–$M_{23}$, the outputs of eight consecutively numbered memory elements, for example, the memory elements $M_8$–$M_{15}$ being coupled to the inputs of the memory elements $M_{16}$–$M_{23}$. The data sequence generator generates a first 8-bit word in the memory elements $M_8$–$M_{15}$, stores this word in the eight memory elements $M_{16}$–$M_{23}$, and subsequently generates a second 8-bit word in the memory elements $M_8$–$M_{15}$. A 16-bit word of the data sequence is now taken from the memory elements $M_8$–$M_{23}$ and combined with a 16-bit word of the signal to be processed, reading out and combining being effected with a frequency corresponding to the bit rate of the signal to be processed, divided by sixteen.

It is to be noted that polynomials $P(X)=x^{15}+X^7+1$ and $P(X)=X^{15}+X^8+1$ define basically identical data sequences which are mirror-inverted in time relative to one another. Processing of a data block by means of the one data sequence will therefore yield the same result as processing by means of the other data sequence, provided that this processing is also effected mirror-inverted in time, i.e., the last bit of the data block is processed first, then the penultimate bit, etc., and finally the first bit of the data block. Since a recording/reproducing arrangement for digital signals comprises several buffers which store data blocks temporarily for further signal processing, it is readily possible to apply the recording signal blocks to the coding device in time-inverted form, to combine these time-inverted blocks with said other data sequence in this device, and to store the resulting time-inverted channel signal blocks in a buffer and to time-invert them again for recording on the tape. During reproduction, the channel signal blocks can be processed in a similar inverted manner in order to form the reproduction signal blocks.

A magnetic-tape recording/reproducing arrangement in accordance with the invention is particularly suitable for recording and/or reproducing a digitally coded video signal because in such an arrangement, it is of great importance that the objects of the invention are achieved. However, it is to be noted that a magnetic-tape recording/reproducing arrangement need not necessarily comprise source encoding means and/or source decoding means; conversion of an (analog) video signal into, for example, an MPEG-coded video signal and vice versa may be effected outside the recording/reproducing arrangement. Since it is not relevant for the invention where this source encoding and/or source decoding is effected, the invention also relates to recording/reproducing arrangements which do not comprise source encoding means and/or source decoding means and which are therefore also suitable for recording and/or reproducing digital signals other than digitally coded video signals, such as, for example, computer data and digitally coded audio signals.

Furthermore, it is to be noted that in cases where a magnetic-tape recording/reproducing arrangement is referred as being of the "helical scan" type, the invention likewise relates to all magnetic-tape recording/reproducing arrangements using rotary heads for writing and reading tracks which are inclined relative to the transport direction of the magnetic tape. Therefore, this is to be understood to include also arrangements of the "transversal scan" type and arrangements of the "arcuate scan" type.

BRIEF DESCRIPTION OF THE DRAWINGS

The invention will now be described in more detail, by way of example, with reference to the drawings. In the drawings.

DESCRIPTION OF THE PREFERRED EMBODIMENTS

Figure 1:
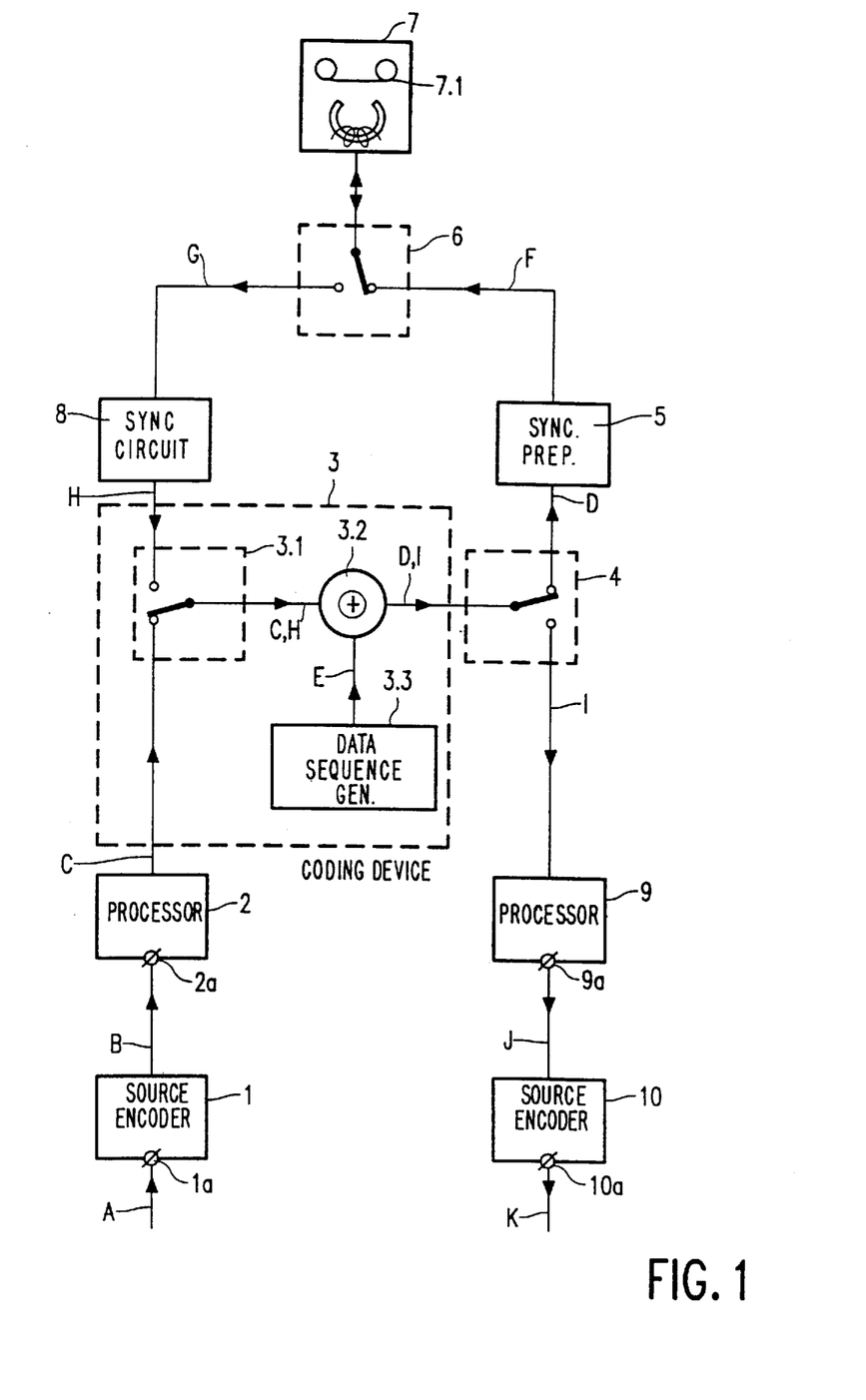
FIG. 1 is a block diagram of a magnetic-tape recording/reproducing arrangement in accordance with the invention.

The block diagram in FIG. 1 shows, diagrammatically, those parts of a magnetic-tape recording/reproducing arrangement in accordance with the invention which are relevant for a correct understanding of the invention. When the arrangement is in a recording mode, the signal to be recorded is subjected to the following operations:

Source encoding. If the signal A, to be recorded and applied to the input 1a, is an analog video signal, it is first converted into, for example, an MPEG-coded video signal in the source encoding means 1. The resulting digital signal B is referred to hereinafter as the incoming digital signal;

Block structuring. The incoming digital signal B is divided into groups of 792 bits in the processing means 2, after which error-correction data is added to each group. Thus, recording signal blocks of 856 bits each are formed, the resulting recording signal C comprising a stream of these recording signal blocks;

Channel coding. During recording, the signal selection means 3.1 is in the position shown, as a result of which the recording signal C is further processed in the coding device 3 in order to form the channel signal D. This processing comprises combining, in an XOR circuit 3.2, the recording signal C with a data sequence E, which is generated in a data sequence generator 3.3. This data sequence generator generates a maximum-length sequence defined by the polynomial $P(X)=X^{15}+X^7+1$. Since the recording signal C has a block structure (recording signal blocks), the resulting channel signal D also has a block structure, and comprises channel signal blocks;

Synchronization preparation. During recording, the resulting channel signal D is applied to the synchronization preparation means 5 by signal routing means 4. In the synchronization preparation means, a synchronization pattern is added to each channel signal block, resulting in a transport signal block. The transport signal block F thus formed comprises a stream of transport signal blocks for recording; and Recording. The transport signal is applied to a write/read device 7 via switching means 6, the write/read device recording the signal on a magnetic tape 7.1 after preparatory processing for recording. The write/read device writes helical tracks on the magnetic tape; a track as recorded on the tape comprises 306 transport signal blocks.

When the arrangement is in a reproducing mode, the signal to be reproduced is subjected to the following operations:

Reading. The write/read device 7 reads a signal from the magnetic tape 7.1, processes this signal to form a digital transport signal G and applies this transport signal to synchronization means 8 via the switching means 6 (which, during reproduction, is in another position than the position shown);

Synchronization. The synchronization means 8 check the transport signal G for the presence of synchronization patterns. If these patterns are detected, the transport signal is divided into transport signal blocks. From these transport signal blocks, the channel signal blocks are extracted and outputted as the channel signal H;

Channel decoding. The channel signal H is applied to the coding device 3. During reproduction, the signal selection means 3.1 is in another position than the position shown. In the coding device 3, the channel signal H is processed in order to form the reproduction signal I. This processing corresponds to the processing during recording and, thus, cancels the processing performed during recording. The processing comprises combining, in the XOR circuit 3.2, the channel signal H with a data sequence E generated in the data sequence generator 3.3. The data sequence generator generates a maximum-length sequence defined by the polynomial $P(X)=X^{15}+X^7+1$;

Signal structuring. During reproduction, the resulting reproduction signal I is applied to processing means 9 by signal routing means 4 (which is now in another position than the position shown). In the processing means, error correction is applied, after which the signal is rid of the block structure applied in the processing means 2 in the recording mode. At the output 9a of the processing means 9, this yields the digital outgoing signal J which is a replica of the original digital incoming signal B; and Source decoding. The digital outgoing signal J at the output 9a is, for example, an MPEG-coded video signal. In the source decoding means 10, this signal is converted into an analog video signal K, which is subsequently available at the output 10a in order to be applied to, for example, a television receiver.

In another embodiment of the magnetic-tape recording/reproducing arrangement in accordance with the invention, the arrangement does not include source encoding means 1. Such an embodiment is advantageous when an MPEG-coded video signal is transmitted and is consequently available at the output of the tuner (not shown), and also when a digitally coded video signal from another source, for example, a camera or a set-top box, is available. Thus, in this embodiment, an incoming digital signal can be applied directly to the input 2a, without the use of any further source encoding.

In yet another embodiment, the magnetic-tape recording/reproducing arrangement in accordance with the invention does not comprise source decoding means 10. Such an embodiment is advantageous when an MPEG-coded video signal can be processed further outside the recording/reproducing arrangement, for example, in the television set. In this embodiment, the digital signal J is available directly from the output 9a, i.e., without the use of any further source decoding.

These two alternative embodiments can also be combined to form an embodiment without source encoding and decoding means.

Figure 2:
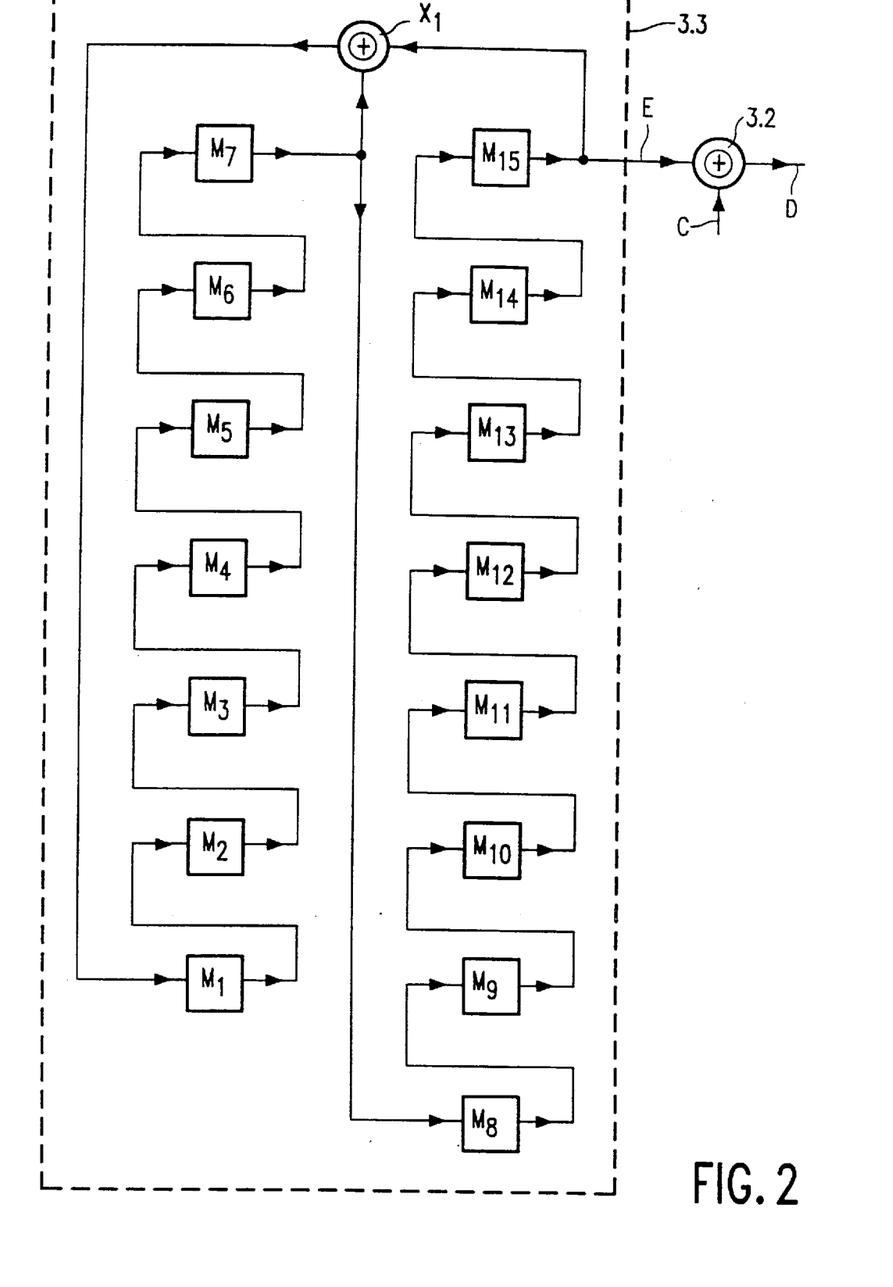
FIG. 2 shows an embodiment of the coding device.

FIG. 2 shows an embodiment of the coding device 3. This embodiment comprises a data sequence generator 3.3, comprising fifteen serially coupled memory elements $M_1 \ldots M_{15}$, and one XOR circuit $X_1$. The output of each of the memory elements $M_1 \ldots M_{14}$ is coupled to the input of the memory element bearing the next high number. The output of the last memory element $M_{15}$ and the output of the seventh memory element $M_7$ are each coupled to an input of the XOR circuit $X_1$. The output of this XOR circuit $X_1$ is coupled to the input of the first memory element $M_1$.

The data sequence generator further comprises trigger-signal paths, not shown in this Figure: Each memory element has a trigger input for receiving a trigger signal. When a trigger signal is received, the data bit on the input of the memory element is loaded into the memory element and is transferred to its output. The trigger inputs of the memory elements have been coupled to one another and receive a trigger signal of a frequency corresponding to the bit rate of the recording signal C. The data sequence generator further comprises preset-signal paths, also not shown in this Figure: Each memory element has a preset input for receiving one bit of a preset signal and a preset-enable input for receiving a preset-enable signal. When the preset-enable signal is received, the bit on the preset input of the memory element is loaded into the memory element and is transferred to its output. The preset enable inputs of the memory elements have been coupled to one another and receive a preset-enable signal for each recording signal block in the recording signal C. The preset signal (15 bits) is always adjusted in such a manner that all recording signal blocks within a period of 12 tracks are scrambled with a different data sub-sequence.

The data sequence E is taken from the generator 3.3 at the output of the memory element $M_{15}$. The coding device 3 further comprises an XOR circuit 3.2 for combining the data sequence E with the recording signal C so as to form the channel signal D.

Figure 3:
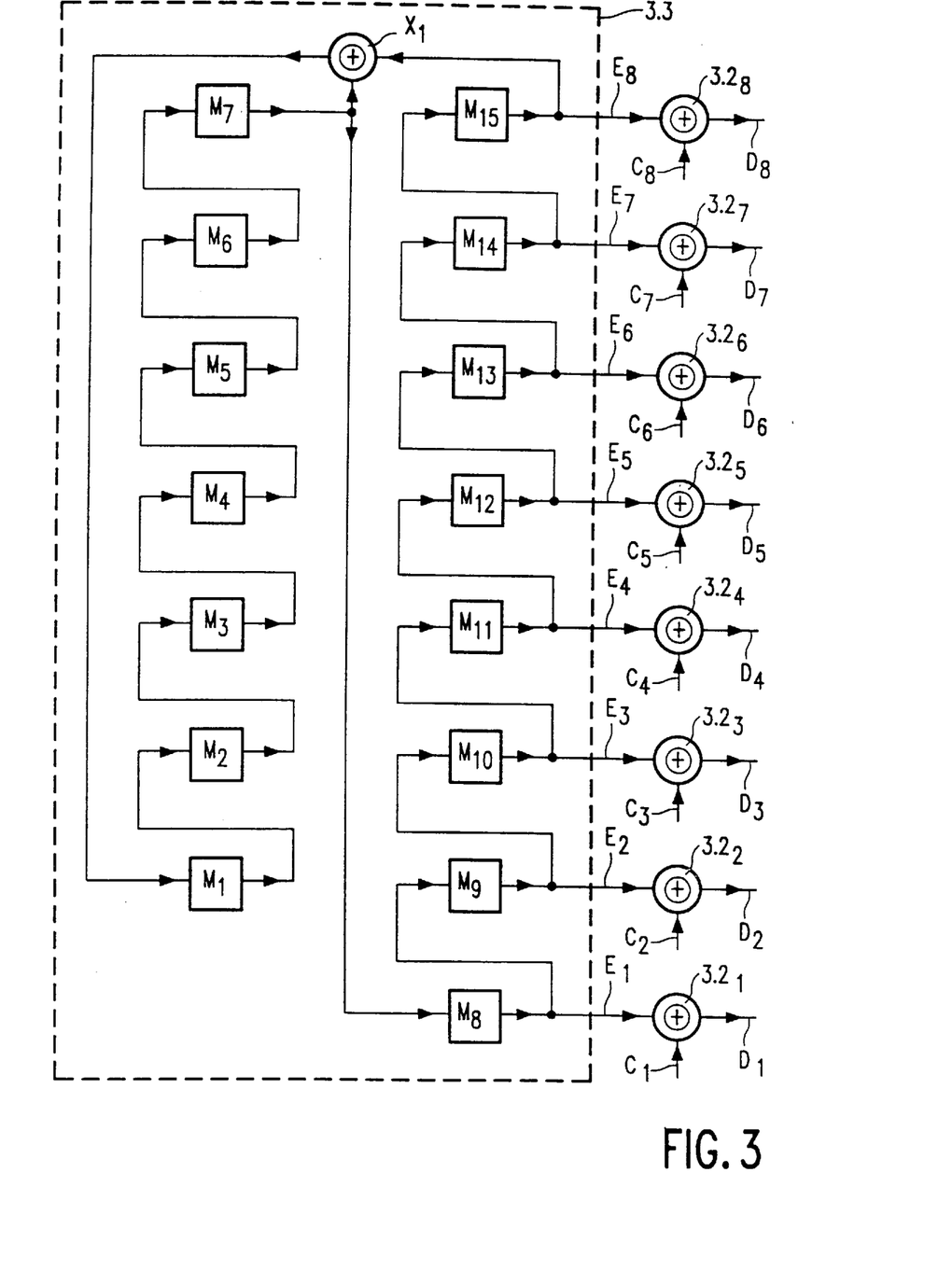
FIG. 3 shows another embodiment of the coding device.

FIG. 3 shows another embodiment of the coding device. In this embodiment, the data sequence generator 3.3 is of a construction similar to that in FIG. 2, with the exception that now 8 bits of the data sequence E are taken from the generator, at the outputs of the memory elements $M_8$ ... $M_{15}$. In 8 XOR circuits $3.2_1$ ... $3.2_8$, this 8-bit word $E_1$ ... $E_8$ is combined with an 8-bit word $C_1$ ... $C_8$ of the recording signal C, in order to form an 8-bit word $D_1$ ... $D_8$ of the channel signal D. Similarly to the embodiment shown in FIG. 2, the data sequence generator of FIG. 3 further comprises trigger-signal paths and preset-signal paths, not shown in the present Figure. In the present embodiment, the trigger inputs of the memory elements $M_1$ ... $M_{15}$ likewise receive a trigger signal of a frequency corresponding to the bit rate of the recording signal C, but the 8-bit word $D_1$ ... $D_8$ of the channel signal D is to be read out with a frequency which is only one-eighth of the bit rate for further processing. Consequently, the 8-bit word $C_1$ ... $C_8$ of the recording signal C need also be applied with this frequency which is only one-eighth of the bit rate. Therefore, this embodiment is advantageous in implementations which perform operations upon 8-bit words.

The embodiments of the coding device 3 as shown in FIGS. 2 and 3 have been constructed to generate a data sequence defined by the polynomial $P(X)=X^{15}+X^7+1$. These embodiments can simply be adapted to generate a data sequence defined by the polynomial $P(X)=X^{15}+X^8+1$. For this purpose, the output of the eighth memory element $M_8$ is coupled to the input of the XOR circuit $X_1$ instead of to the output of the seventh memory element $M_7$.

Figure 4:
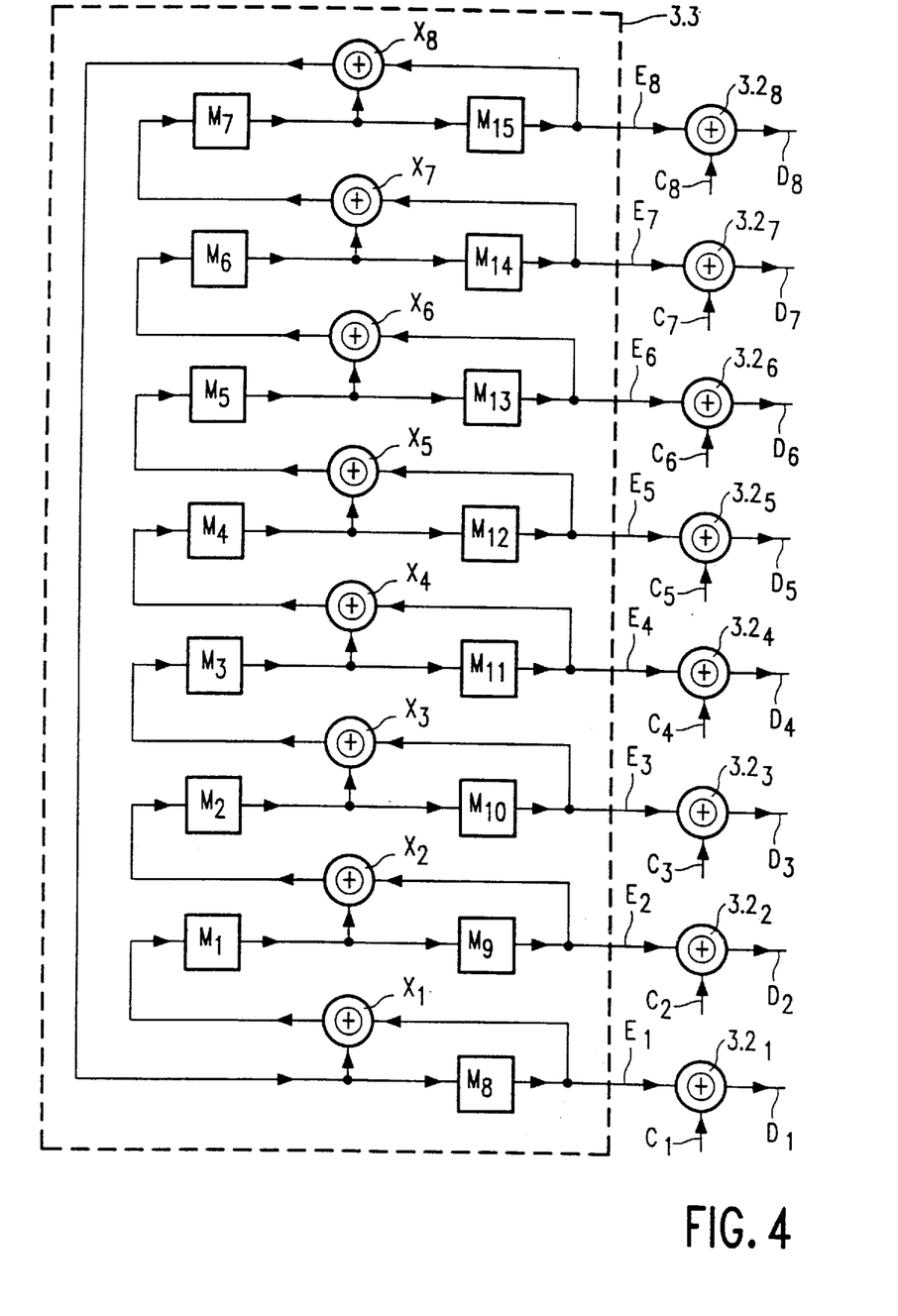
FIG. 4 shows yet another embodiment of the coding device.

FIG. 4 shows yet another embodiment of the coding device 3, adapted to generate a data sequence defined by the polynomial $P(X)=X^{15}+X^7+1$. This embodiment has a data sequence generator 3.3 comprising fifteen coupled memory elements $M_1$ ... $M_{15}$ and eight XOR circuits $X_1$ ... $X_8$. The XOR circuit $X_8$ has its output coupled to the input of the memory element $M_8$ and to an input of the XOR circuit $X_1$. The memory element $M_8$ has its output coupled to the other input of the XOR circuit $X_1$. Furthermore, the memory elements and XOR circuits are coupled as seven identical sub-configurations, n=1 ... 7: The XOR circuit $X_n$ has its output coupled to the input of the memory element $M_n$. The memory element $M_n$ has its output coupled to the input of the memory element $M_{n+8}$ and to an input of XOR circuit $X_{n+1}$. The memory element $M_{n+8}$ has its output coupled to the other input of the XOR circuit $X_{n+1}$.

Each time, 8 bits of the data sequence E are taken from the memory elements $M_8$ ... $M_{15}$. In 8 XOR circuits $3.2_1$ ... $3.2_8$, this 8-bit word $E_1$ ... $E_8$ is combined with an 8-bit word $C_1$ ... $C_8$ of the recording signal C in order to form an 8-bit word $D_1$ ... $D_8$ of the channel signal D. Similarly to the embodiment shown in FIG. 2, the data sequence generator of FIG. 4 further comprises trigger-signal paths and preset-signal paths, not shown in the present Figure. In the present embodiment, the trigger inputs of the memory elements $M_1$ ... $M_{15}$ likewise receive a trigger signal of a lower frequency corresponding to the bit rate of the recording signal C divided by 8. The -bit word $D_1$ ... $D_8$ of the channel signal D need also be read out with this lower frequency for further processing. Therefore, this embodiment is advantageous in implementations which perform operations upon 8-bit words and, moreover, this embodiment has a lower current consumption because the data sequence generator operates at a lower frequency.

For the embodiments shown in FIGS. 2, 3 and 4, the signals indicated as having been processed and supplied by the coding device during recording are the recording signal C and the channel signal D. However, these embodiments are equally suitable for use in a reproduction mode; the signal to be processed is then the channel signal H, and the processed signal is then the reproduction signal I. These embodiments may also be provided with signal selection means (3.1 in FIG. 1) in order to select, depending on whether the arrangement is in a recording or a reproduction mode, the recording signal C or the channel signal H read from the magnetic tape in order to be combined with the generated data sequence E.

The invention thus provides a magnetic-tape recording/reproducing arrangement of the "helical scan" type constructed to record and/or reproduce a digitally coded video signal and comprising a coding device. In the recording mode, the coding device processes a digital recording signal (channel encoding) so as to form a channel signal to be recorded on the magnetic tape. In the reproduction mode, the coding devices processes the channel signal read from the magnetic tape (channel decoding) so as to form a digital reproduction signal which is a replica of the original recording signal. For this purpose, the coding device comprises a data sequence generator adapted to generate a data sequence defined by the polynomial $P(X)=X^{15}+X^7+1$ or by the polynomial $P(X)=X^{15}+X^8+1$. Moreover, the coding device preferably comprises modulo-2 adding means, in which the signal to be processed is combined with the generated data sequence, and selection means with which the signal to be processed is selected from the recording signal and the channel signal, depending on the mode of operation of the recording/reproducing arrangement. The invention further provides embodiments of the coding device adapted to generate N-bit words of the data sequence and to combine these N-bit words with N-bit words of the signal to be processed.

It is to be noted that the invention is not limited to the preferred embodiments described herein. Those skilled in the art will be able to envisage variants which fall within the scope of the invention as defined in the following claims. Thus, the data sequence generator, for example, can also be implemented with a memory, such as a 4 k×8 ROM, in which the data sequence has been preprogrammed. One word of the data sequence, for example, an 8-bit word, is read from the memory, after which the memory is addressed in such a manner that the next word of the data sequence becomes available for read-out. By starting the read-out of the data sequence at a suitable ROM address for each recording signal block, it is achieved that all recording signal blocks within a period of 12 tracks are scrambled with different data sub-sequences. Furthermore, although it has been described here in terms of hardware means, the invention can also be realized by a software program which controls the functions of a programmable device, such as a microprocessor or a digital signal processor. Such realizations also fall within the scope of the invention. It is particularly advantageous to incorporate the invention in a software program which also performs other signal processing functions for recording and/or reading a digital signal, and to select, for this purpose, an embodiment adapted, as described hereinbefore, to the word length used in these other signal processing functions.

We claim:

1. A magnetic-tape recording/reproducing arrangement of the "helical scan" type adapted to record and/or reproduce a digitally coded video signal, the arrangement comprising a coding device for channel-encoding a digital recording signal in order to form a channel signal for recording on a magnetic tape and/or for channel-decoding a channel signal read from the magnetic tape in order to form a digital reproduction signal, characterized in that the coding device comprises a data sequence generator for generating a data sequence defined by the polynomial $P(X)=X^{15}+X^{A}+1$, where A=7 or 8.

2. A magnetic-tape recording/reproducing arrangement as claimed in claim 1, characterized in that the coding device further comprises modulo-2 adding means for combining the generated data sequence with the digital recording signal to form the channel signal to be recorded on the magnetic tape, or for combining the generated data sequence with the channel signal read from the magnetic tape to form the digital reproduction signal.

3. A magnetic-tape recording/reproducing arrangement as claimed in claim 2, characterized in that the data sequence generator generates an N-bit word, and the modulo-2 adding means comprises N eXclusive-OR (XOR) circuits for combining the N-bit word from the data sequence generator with an N-bit word of the signal to be processed, for forming an N-bit word of the processed signal, where N>1.

4. A magnetic-tape recording/reproducing arrangement as claimed in claim 3, characterized in that the data sequence generator generates N-bit words, said N-bit words being generated with a frequency corresponding to a bit rate of the signal to be processed divided by N.

5. A magnetic-tape recording/reproducing arrangement as claimed in claim 3, or characterized in that N=8.

6. A magnetic-tape recording/reproducing arrangement as claimed in claim 3, characterized in that N=16.

7. A magnetic-tape recording/reproducing arrangement as claimed in claim 1, characterized in that the data sequence generator comprises fifteen serially coupled memory elements ($M_1 \ldots M_{15}$) and an eXclusive-OR (XOR) circuit, the memory element $M_k$, where k=1 ... 14, having an output coupled to an input of the memory element $M_{k+1}$, the last memory element ($M_{15}$) having an output coupled to a first input of the XOR circuit, and the seventh or the eighth memory element ($M_A$) having an output coupled to a second input of the XOR circuit, and the XOR circuit having an output coupled to an input of the first memory element ($M_1$).

8. A magnetic-tape recording/reproducing arrangement as claimed in claim 7, wherein the data sequence generator generates an N-bit word, and the modulo-2 adding means comprises N eXclusive-OR (XOR) circuits for combining the N-bit word from the data sequence generator with an N-bit word of the signal to be processed, for forming an N-bit word of the processed signal, where N>1, characterized in that each of N consecutively numbered memory elements ($M_{X+1} \ldots M_{X+N}$) has an output coupled to an input of a respective one of the N XOR circuits of the modulo-2 adding means.

9. A magnetic-tape recording/reproducing arrangement as claimed in claim 8, characterized in that N=8.

10. A magnetic-tape recording/reproducing arrangement as claimed in claim 1, characterized in that A=7, and the data sequence generator comprises fifteen coupled memory elements ($M_1 \ldots M_{15}$) and eight eXclusive-OR (XOR) circuits ($X_1 \ldots X_8$), the XOR circuit $X_n$ having an output coupled to an input of the memory element $M_n$, where n=1 ... 7, the memory element $M_n$ having an output coupled to an input of the memory element $M_{n+8}$ and to a first input of the XOR circuit $X_{n+1}$, the memory element $M_{n+8}$ having an output coupled to a second input of the XOR circuit $X_{n+1}$, the XOR circuit $X_8$ having an output coupled to an input of the memory element $M_8$ and to a first input of the XOR circuit $X_1$, and the memory element $M_8$ having an output coupled to a second input of the XOR circuit $X_1$.

11. A magnetic-tape recording/reproducing arrangement as claimed in claim 1, characterized in that the coding device further comprises selection means for selecting the signal to be processed from the digital recording signal and the channel signal read from the magnetic tape.

12. A coding device for use in a magnetic-tape recording/reproducing arrangement of the "helical scan" type as claimed in claim 1, characterized in that the coding device comprises:

means for selecting one of a plurality of input signals;

a data sequence generator for generating a data sequence defined by the polynomial $P(X)=X^{15}+X^{A}+1$, where A=7 or 8;and means for combining the selected input signal with the generated data sequence.

13. A method of recording a digitally coded video signal in helical tracks on a magnetic tape by channel encoding a digital recording signal to form a channel signal for recording on the magnetic tape, characterized in that the channel encoding comprises the steps:

generating a data sequence defined by the polynomial $P(X)=X^{15}+X^{A}+1$, where A=7 or 8; and combining the recording signal with the generated data sequence.

14. A magnetic tape on which a signal has been recorded in helical tracks, characterized in that the signal has been encoded by combination with a data sequence defined by the polynomial $P(X)=X^{15}+X^{A}+1$, where A=7 or 8.

* * * * *